United States Patent [19]

Krick

[11] 3,846,768

[45] Nov. 5, 1974

[54] FIXED THRESHOLD VARIABLE THRESHOLD STORAGE DEVICE FOR USE IN A SEMICONDUCTOR STORAGE ARRAY

[75] Inventor: Paul J. Krick, Crugers, N.Y.

[73] Assignee: International Business Machines Corporation, Armonk, N.Y.

[22] Filed: Dec. 29, 1972

[21] Appl. No.: 319,406

[52] U.S. Cl. .............. 340/173 R, 307/238, 307/279, 307/304

[51] Int. Cl. .............. G11c 11/40

[58] Field of Search .............. 340/173 FF, 173 R; 307/238, 279, 304

[56] References Cited

UNITED STATES PATENTS

| | | | |
|---|---|---|---|
| 3,206,730 | 9/1965 | Igarashi | 340/173 R |
| 3,488,636 | 1/1970 | Dyck | 340/173 R |
| 3,585,613 | 6/1971 | Palfi | 340/173 R |
| 3,761,896 | 9/1973 | Davidson | 340/173 R |
| 3,761,901 | 9/1973 | Aneshansley | 340/173 R |

*Primary Examiner*—Terrell W. Fears
*Attorney, Agent, or Firm*—Thomas J. Kilgannon, Jr.

[57] ABSTRACT

A composite information storage device which includes a variable threshold device and at least a fixed threshold device is disclosed. The device basically consists of a semiconductor substrate of one conductivity type having a pair of regions of opposite conductivity type disposed therein and defining a channel region therebetween. The variable threshold device is an MNOS (metal-nitride-silicon oxide-semiconductor) device while the fixed threshold device is an MOS device. Alternatively, the variable threshold device could be an MAOS (metal-aluminum oxide-silicon oxide-semiconductor) device. For one reason or another, the variable threshold device, when it is subjected to repeated reading, writing, and erasing cycles, tends to become a depletion mode device and consequently conducts with zero voltage on its gate when reading takes place. To obviate spurious conduction in an array which would effectively remove all the devices associated with a given bit line from the array, a fixed threshold device actuated by a common gate is formed using the same channel region to insure against spurious turn-on of a storage device when it is in the low threshold condition. The fixed threshold device is obtained by providing at least a single insulator layer of thickness sufficient to prevent tunneling therethrough and to provide a threshold voltage which causes the fixed threshold device to operate in the enhancement mode. By insuring that the device operates in the enhancement mode, when variable threshold devices which have tended to become depletion mode devices are interrogated, spurious paths are eliminated which would otherwise permit current to flow when zero volts are applied to a device associated with the same bit line which is not being interrogated. For convenience in fabrication, two fixed threshold devices are normally associated with the same channel region as the variable threshold device. Using this arrangement, the resulting cell lays out in an area which is only 20% larger than when no fixed threshold devices are incorporated.

25 Claims, 8 Drawing Figures

FIG. 4 READ CYCLE WAVEFORMS
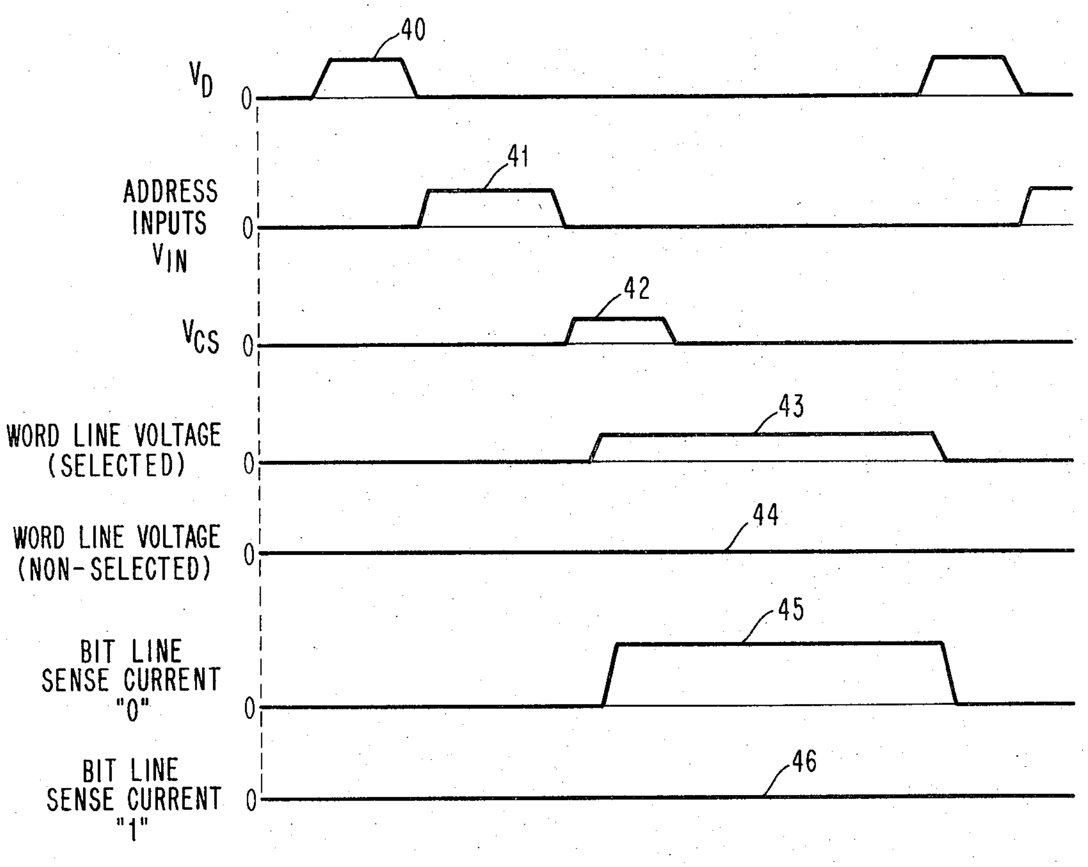
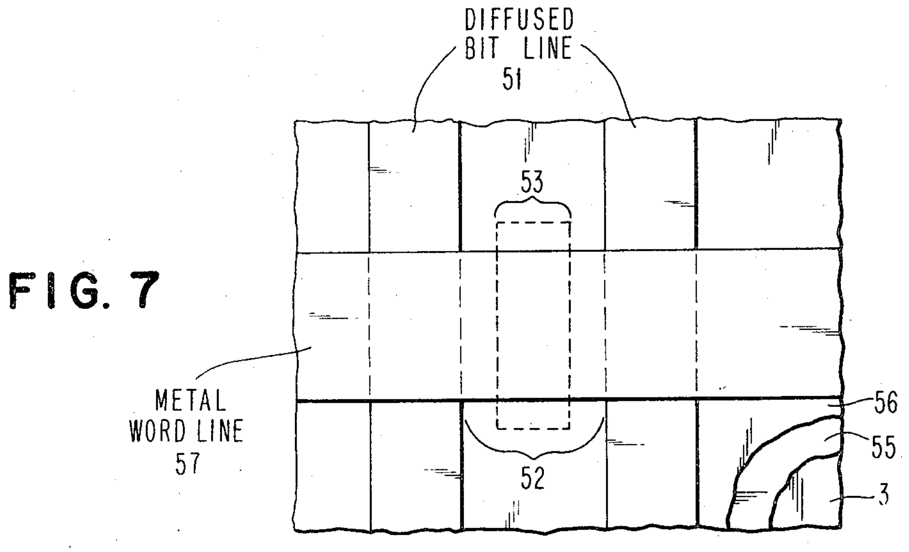
FIG. 7

FIG. 5
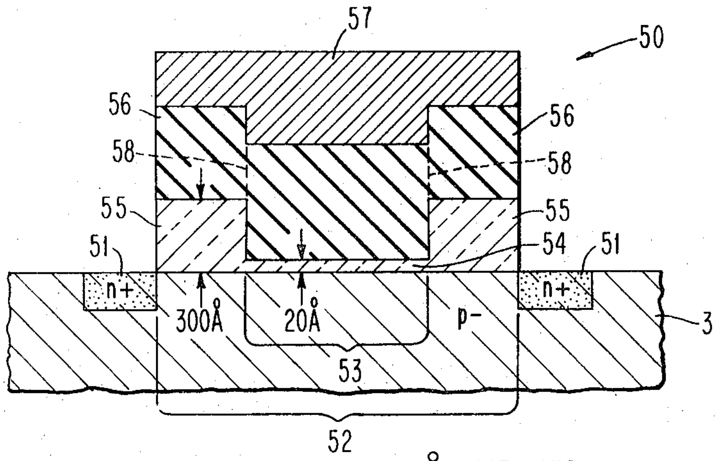
FIG. 6
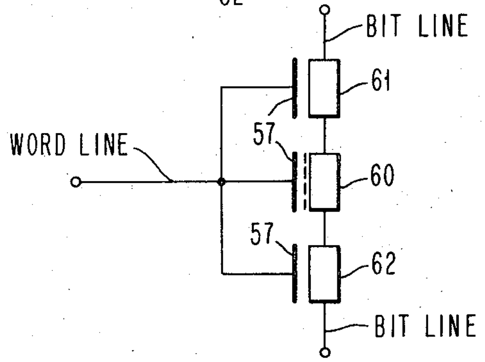
FIG. 3 WRITE CYCLE WAVEFORMS
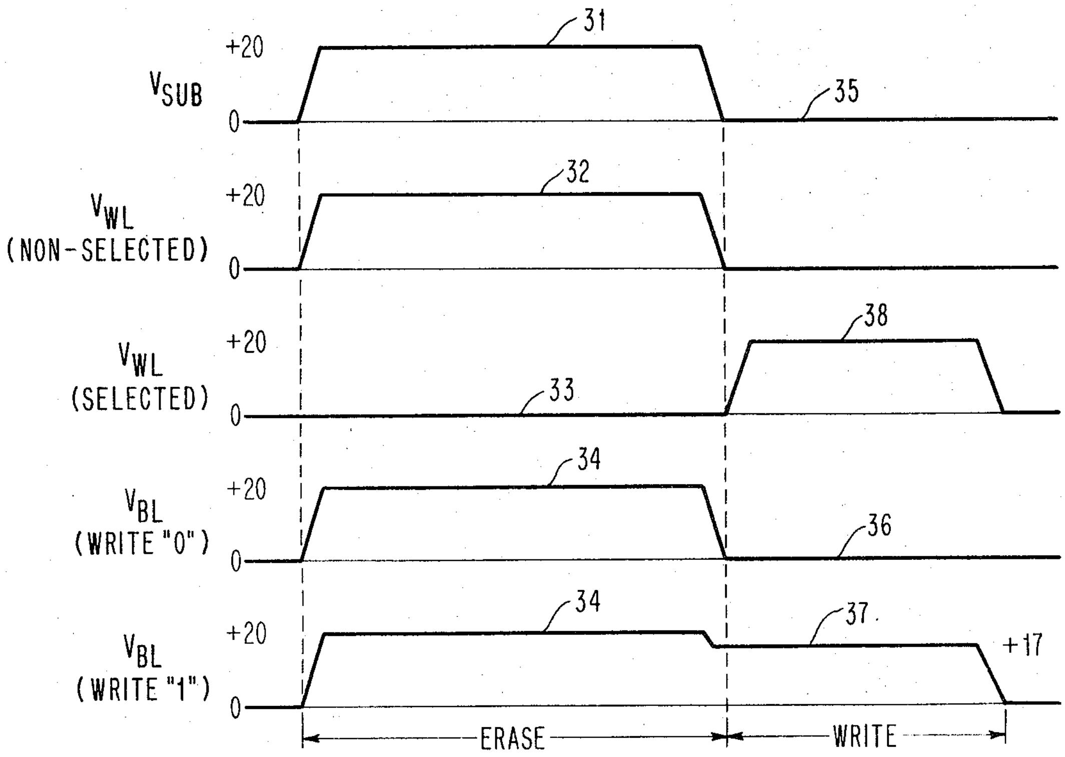

FIXED THRESHOLD VARIABLE THRESHOLD STORAGE DEVICE FOR USE IN A SEMICONDUCTOR STORAGE ARRAY

BACKGROUND OF THE INVENTION

1. Field of the Invention

This invention relates generally to semiconductor storage devices for use in read-only and random access memory arrays. More specifically, it relates to variable threshold field-effect transistor devices such as MNOS or MAOS devices which have electrically alterable high and low threshold conditions. Still more specifically, it relates to a composite field-effect transistor device which includes, along with the variable threshold device, at least a fixed threshold device. Both of the devices are disposed over the same channel region as defined by a pair of opposite conductivity type regions in a substrate and are controlled by a common gate electrode. Such devices, when formed into an array in the integrated circuit environment, are utilized to prevent spurious turn-on of variable threshold devices which tend to become depletion mode devices after a number of storage, erase, and read cycles. In addition, the use of the fixed threshold device in conjunction with a variable threshold device permits the isolation of devices which are caused to become depletion mode devices due to processing failures by not requiring elimination of all bits on the same bit line as the defective bits. The use of such devices, therefor, extends the useful life of arrays into which they are incorporated and further permits the use of memory arrays where only a small number of bits are defective resulting in a substantial increase in chip yields.

2. Description of the Prior Art

MNOS (Metal-Nitride-oxide-Semiconductor) devices are well known. In addition, fixed threshold field-effect transistors are well known. With respect to fixed threshold devices, U.S. Pat. No. 3,374,407, issued Mar. 19, 1968 in the name of J. A. Olmstead, recognizes that field-effect transistor turn-on may be controlled by varying the thickness and kind of insulation disposed over the channel region of a field-effect transistor. U.S. Pat. No. 3,335,598, issued Nov. 28, 1967 in the name of J. W. Tuska, utilized a plurality of gates to render successive portions of a channel region between a pair of diffusions conductive. Each of the gates are separately actuated and have the same threshold and the same thickness of dielectric beneath their gate electrodes.

IBM Technical Disclosure Bulletin, Vol. 14, No. 4, September 1971, p. 1077–8, discloses a storage cell using double threshold field-effect transistors. In this arrangement, a field-effect transistor has higher conductivity channel regions implanted around a lower conductivity region, all of which are disposed between source and drain diffusions. These field-effect transistors are utilized in conjunction with a pair of cross-coupled field-effect transistor storage devices, such that when read-out of the cross-coupled devices is required a high threshold voltage is applied, rendering the low resistivity paths conductive while during standby, the high resistivity path controlled by a low threshold voltage is utilized.

An article entitled, "Reach Through Mode Operation of Single Electrode Double Threshold Charge Coupled Memory Cell," in the IBM Technical Disclosure Bulletin, Vol. 15, No. 2, July 1972, p. 412, shows an arrangement in which a channel region is formed between two word line diffusions disposed in a semiconductor substrate. Portions of the channel regions have different thresholds as a result of the varying thickness of dielectric disposed over respective channel portions. This arrangement, however, does not include a variable threshold device such as an MNOS device and tunneling through the oxide layer is not permitted.

In this arrangement, there is no storage of charge at the interface between the oxide and the nitride and, consequently, no drift toward a depletion mode operation as a result of repeated cyclings. In the arrangement shown, the problem of threshold drift is not present and only occurs, as far as is known, in devices of the character of MNOS and MAOS devices.

U.S. Pat. No. 3,436,622, issued Apr. 1, 1969 in the name of R. M. Werner, Jr., shows two field effect transistors in series, each of which has a separate channel but is controlled by a single gate electrode. This arrangement does not suggest the use of variable threshold devices, but recognizes that the threshold voltage of the devices involved can be controlled by controlling the thickness of the insulating layer over the channel regions.

SUMMARY OF THE INVENTION

The composite information storage device consisting of a fixed threshold-variable threshold storage device, in its broadest aspect, comprises a semiconductor substrate of one conductivity type having a pair of regions of opposite conductivity type disposed in substrate and defining a channel region therebetween. It further comprises a variable threshold device which includes a first portion of the channel region and at least a fixed threshold device which includes a portion of the channel region different from the first mentioned portion.

In accordance with the broader aspects of the invention, a storage device is provided comprising a semiconductor wafer of one conductivity type having disposed therein source and drain regions of opposite conductivity type and a channel region disposed therebetween. The storage device further comprises an oxide layer having at least first and second portions disposed over the channel region; the first portion having a thickness sufficient to permit the tunneling of carriers therethrough and a second portion having a thickness sufficient to prevent tunneling of carriers therethrough to provide a fixed threshold device in series with a variable threshold device.

In accordance with the broader aspects of the invention, the storage devices of a memory array which are subjected to repeated storage, erase, and read-out cycles, each comprise a semiconductor substrate having source and drain region disposed therein and defining a channel region therebetween. In addition, means are disposed in electrically coupled relationship with a portion of the channel for rendering that portion conductive at high and low threshold voltages. The latter voltage is of such magnitude as to be spuriously conducting in a depletion mode. Means are also disposed in electrically coupled relationship with at least another portion of the channel for rendering it conductive at a fixed threshold voltage. This voltage is independent of the low threshold voltage mentioned above and is of such magnitude as to be conductive in an enhancement mode.

In accordance with more particular aspects of the invention, the fixed threshold device may be an MOS, an MAOS, or an MNOS device. In the latter two instances, the oxide is sufficiently thick to prevent tunneling. The variable threshold device is either an MNOS or an MAOS device. Both the fixed and variable threshold devices are actuated by a common gate electrode.

It is, therefore, an object of this invention to provide a composite information storage device actuated by a common gate electrode which is not subject to the effects of threshold drift.

Another object is to provide a composite enhancement-depletion mode device which is effectively operates as an enhancement mode device.

Another object is to provide a fixed threshold and variable threshold device as storage elements in an array, which, because of the series configuration of the fixed and variable threshold devices, permits on-chip decoding using enhancement mode devices.

Still another object is to provide an array of variable threshold devices which are not subject to spurious read-out when zero potential is present on a non-selected word-line during the reading cycle of an array.

Still another object is to provide a storage device consisting of a pair of fixed threshold devices in series with a variable threshold device which incurs only a minimal increase in layout area due to the presence of the additional fixed threshold device.

The foregoing and other objects, features and advantages of the invention will become apparent from the following more particular description of the preferred embodiment of the invention as illustrated in the accompanying drawings.

BRIEF DESCRIPTION OF THE DRAWINGS

FIG. 3 shows the write cycle wave forms utilized in writing information into a storage device of the array of FIG. 2.

FIG. 4 shows the read cycle wave forms for reading information out of the storage devices of the array shown in FIG. 2.

FIG. 5 is a cross-sectional view of a storage device in accordance with the present invention which consists of a variable threshold device and a pair of fixed threshold devices disposed over a common channel region and controlled by a common gate electrode.

FIG. 6 is a schematic diagram of the device of FIG. 3 showing a pair of fixed threshold devices in series with a variable threshold device all of which are controlled from a common source of potentials.

FIG. 7 shows a typical layout for a layout for a storage device in accordance with the teaching of the present invention similar to that shown in FIG. 5.

DESCRIPTION OF PREFERRED EMBODIMENTS

While the present teaching can be applied to other storage devices such as MAOS devices, the invention herein will be exemplified in what follows using MNOS devices.

The MNOS (Metal-Nitride-Oxide-Silicon) device is an insulated gate field effect transistor which has a two layer gate insulator composed of silicon dioxide and silicon nitride instead of the usual single layer of silicon dioxide. The dual layer gate insulator permits charged storage in the insulator which alters the device threshold voltage. From an operational standpoint, the device can be considered as a field effect transistor which has an electronically variable threshold voltage. The threshold voltage is normally altered by applying a large voltage across the gate insulator. The lower operating (read) voltages of the device have little effect on the device threshold.

A typical MNOS device is written as follows.

A large positive voltage applied between the gate and substrate causes electrons to accumulate at the silicon dioxide-silicon nitride interface. These electrons remain trapped at the interface when the applied voltage is removed and cause the device to exhibit a large threshold voltage (an n-channel device is assumed). To erase the device, a large negative voltage is applied, which removes the electron from the interface and the device exhibits its low threshold voltage.

The primary disadvantage of the MNOS is that in order to write the device in a reasonable period of time, it is necessary to use relatively large write voltage magnitudes (in the 20 volt range). In addition, these write voltages must be of both polarities so that the device can be both written and erased.

Where these devices are to be utilized in an array to form a high density random access memory, it is necessary to use on-chip decoding because of the practial limitation on the number of contacts which can be made to the chip. On-chip decoding is somewhat of a problem with the MNOS because the relatively large write voltages must be of both polarities.

The problem of using write voltages of both polarities is overcome by the memory organization and writing technique shown in the present application which eliminates the need for both positive and negative write voltages on the gates of the MNOS memory devices. If n-channel MNOS devices are assumed, then only positive voltages will be present at any point in the decoder or memory array. Thus, the problem of reverse bias source and drain diffusions in the decoder field effect transistors is eliminated and the signal which must be tolerated by the decoder devices is reduced by a factor of two. This write technique, however, requires that the substrate for the decoder and control devices be isolated from the substrate of the MNOS array. By isolating the substrate of the MNOS array, it is possible to use the MNOS substrate bias in erasing these devices thus eliminating the need for negative voltages on the chip.

Figure 1A:
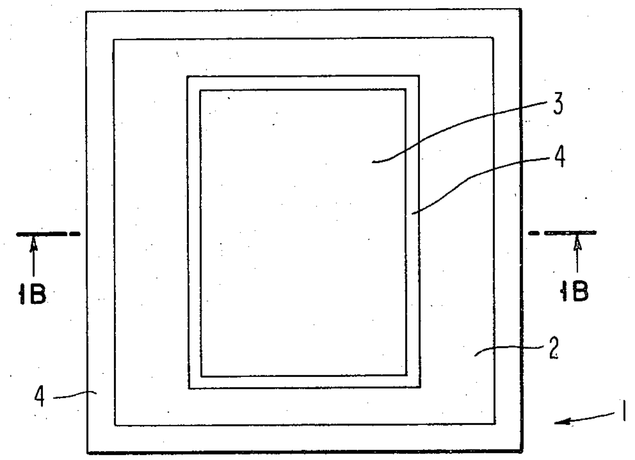
FIG. 1A is a plan view of a semiconductor substrate showing diffused regions which form substrate pools for an MNOS memory array and for field effect transistor decoder and control circuits.

Referring now to FIG. 1A, there is shown therein a plan view of a semiconductor substrate showing diffused regions which form substrate pools for an MNOS memory array and for field effect transistor decoder and control circuits. In FIG. 1A, a semiconductor chip 1 is composed of two p-type substrate pools 2, 3 which are isolated from one another by an n-type region 4. The p-type pool 3 serves as a substrate for the n-channel MNOS array while the other p-type pool 2 serves as the substrate for the decoder and control field effect transistors. The structure of chip 1 may be easily fabricated by diffusing n-type materials into a p-type epitaxial layer which is disposed on a substrate (not shown).

Figure 1B:
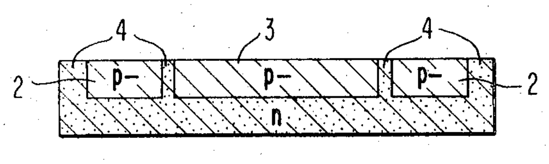
FIG. 1B is a cross sectional view of the semiconductor substrate of FIG. 1A taken along the lines 1B—1B of FIG. 1A.

FIG. 1B shows a cross-sectional view taken along the lines 1B-1B of FIG. 1A and shows the p-type diffusions 2, 3 separated from each other by portions 4 of n-type material.

Figure 2:
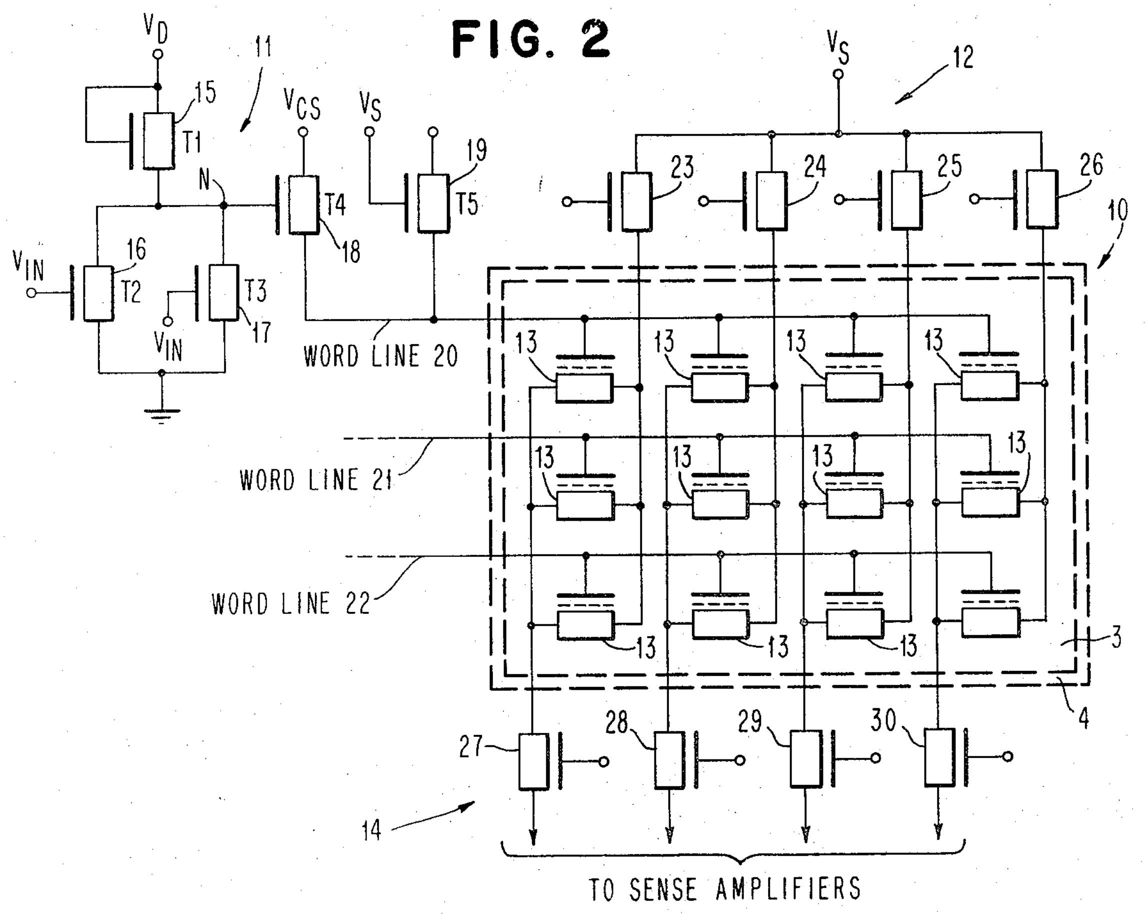
FIG. 2 is a schematic diagram of an MNOS or MAOS memory array which is subject to spurious read-out of a non-selected bit with zero voltage on the word line of the non-selected bit as a result of threshold shift due to repeated read-out, storage, and erasure of the storage devices. The storage array is shown isolated from the decoder and control circuits by an isolation region.

Referring now to FIG. 2, there is shown therein a schematic diagram of a word organized MNOS memory array 10 which is subject to spurious read-out of a nonselected bit with zero voltage on the word line of the nonselected bit as a result of threshold shift due to repeated read-out, storage, and erasure of the MNOS storage devices. The organization shown can be used for either an electronically alterable read-only memory or a large capacity random access memory. The organization shown is for an array of three words of four bits each. Off-chip current sensing is shown since the primary objective in the design of an electronically alterable read-only memory is low read access time. Storage array 10 is shown isolated from the decoder and control circuits 11, 12, respectively, by an isolation region 4 which surrounds a p-type region 3 in which a plurality of MNOS devices 13 are formed. Decoding circuit 11 and control circuit 12 and sense gates 14 are all formed of field effect transistors in a p-type region 2 the bounds of which are not shown in FIG. 2.

In FIG. 2, the n-channel field effect transistors 15, 16, 17, 18, and 19 form a standard NOR block decoder. A regenerative source follower is not used to increase decoder speed because the chip select signal is less than half as large as the decoder output. Hence, device 18 is already effectively overdriven. Field effect transistor 19 is shown connected to word line 20 and is used to discharge the selected word line after reading or writing and to maintain the quiescent potential of the nonselected word lines. While not shown in FIG. 2, it should be appreciated that a decoder circuit 11 is also connected to word lines 21, 22 in a manner similar to that shown for word line 20. Field effect transistors 23–26 of control circuits 12 and field effect transistors 27–30 of bit line decoder circuit 14 are utilized to control the bit line potential during writing and for bit line decoding purposes during reading, respectively.

For purposes of the present application, it is assumed that it is possible to fabricate MNOS devices 13 which are n-channel type devices having the following type characteristics:

Initial threshold voltage with no interface charge of +1 volt, and a threshold shift of 6 volts with the application of 20 volts for 10 microseconds. In FIG. 2, the decoder and control circuits MOSFETS 15–19, 23–26 and 27–30, respectively, are 500 A n-channel devices. Also, the usual asymmetry in the positive and negative write thresholds (hysteresis curve) is not taken into account to simplify the explanation of the writing technique.

Referring now to FIG. 3, there is shown therein the write cycle waveforms utilized in writing information into a storage device 13 of the array 10 of FIG. 2. During the write operation, a plus 20 volt d.c. potential as shown by waveform 31 in FIG. 3 is applied to n-type isolation region 4. This makes it possible to raise the potential of the p-type MNOS substrate pool 3 to a plus 20 volts during writing without forward biasing the substrate p-n junction. Substrate pool 2 for decoder and control circuits 11, 12, and 14 is held at −3 volts during reading and writing.

In FIG. 3, the write cycle is broken into two parts, the "erase" portion and the "write" portion. During the erase portion of the write cycle, all the bits in the address word are erased (put in a 0 state or low threshold state, $V_t$ = 1 volt). This is accomplished by applying +20 volts to p-type substrate pool 3 while all the word lines except the word line of the word being written are held at +20 volts and shown by waveform 32 in FIG. 3. The addressed word line, word line 20, for example, is held at ground potential as indicated by waveform 33. Thus, −20 volts is effectively applied between the gates of devices 13 on addressed word line 20 and substrate 3, causing these devices to assume the low threshold state (0 state). Since zero volts is applied across the gate insulators of the devices not on selected word line 20, these devices 13 do not change state. During the erase portion of the write cycle, bit lines connected to each of the MNOS devices 13 and which emanate from field effect transistors 23–26 have a +20 volts applied thereto as shown by waveform 34 in FIG. 3 via field effect transistors 23–26 which are rendered conductive during the erase portion of the write cycle.

During the second part of the write cycle, a binary 1 is written into selected bits of the word which was erased during the erase part of the write cycle. During this portion of the cycle, p-type substrate pool 3 is held at ground potential as indicated by waveform 35 in FIG. 3. The bit lines emanating from field effect transistors 23–26 for those bits into which a binary 1 is to be written are held at ground potential as shown by waveform 36 in FIG. 3 and the other bit lines are held at +17 volts as shown by waveform 37 in FIG. 3. The application of +20 volts as shown by waveform 38 in FIG. 3 to the selected word line 20 causes +20 volts to appear between the gates and the channels of devices 13 which have a grounded bit line and +3 volts appears between the gates and channels of devices 13 which have a +17 volt bit line potential. The +20 volt potential on word line 20 causes a channel to be formed in all the devices 13 associated with this word line. This channel effectively shields the substrate and assumes the potential of the devices source and drain (bit line potential).

In order to use this write scheme without unintentionally changing the state of some memory devices, it is necessary for certain voltages in the array to track within a few volts of each other. During the erase part of the write cycle, when the substrate potential goes from zero to +20 volts, the nonselected word line voltages 32 and the bit line voltages 34 must track within a few volts of the substrate potential 31. The same condition must be satisfied when the substrate voltage returns to ground potential. This requirement should cause no problems since the direction of capacitor coupling is in the direction to improve tracking and transients are relatively slow during writing.

The most important feature of the present write scheme is that all the devices in the memory array 10 are full selected. This means that all devices 13 in the array experience either the full write voltage (in the case where the state of device 13 is to be changed) or zero voltage. At no time does a device in the array see a half select voltage. This full select write scheme eliminates the requirement that the MNOS devices 13 have a sharp hysteresis curve.

Referring now to FIG. 4, the read cycle waveforms for reading information out of storage devices 13 of array 10 are shown. Selection of the optimum interrogate voltage magnitude ($V_R$) depends on many considerations which will not be dealt with here. For simplicity of expanation, the read voltage magnitude is given by:

$$V_R = V_{TL} + \frac{1}{2}(V_{TH} - V_{TL})$$

Where the $V_{TL}$ is now threshold potential equal to 1 volt and $V_{TH}$ is the high threshold potential equal to 7 volts. This interrogate voltage satisfies the basic criterion that it turns on devices in the low threshold state and does not turn on devices in the high threshold state. Using the waveforms of FIG. 4 in conjunction with the circuit organization of FIG. 2, the waveforms in FIG. 4 show the various potentials utilized to read memory array 10. During the read operation, field effect transistors 23–26 and 27–30 are turned on by the application of an appropriate voltage on their gates. The signal $V_D$ shown by waveform 40 in FIG. 4 associated with field effect transistor 15 is used to charge the internal node N of decoder circuit 11 and to discharge word line 20, for example, which was addressed during the previous cycle through field effect transistor 18.

The address inputs shown by waveform 41 in FIG. 4 are applied to devices 16, 17 of decoder circuit 11 at the termination of the $V_D$ signal and discharge all the internal decoder nodes except for the addressed decoder. A chip select signal $V_{CS}$, shown by waveform 42 in FIG. 4 charges the address word line to the interrogate voltage, $V_R$ which is equal to 4 volts and shown in FIG. 4 by waveform 43. Field effect transistor 18 is nonconductive on all the unaddressed word lines and remains at ground potential as shown in FIG. 4 by waveform 44. On the addressed word line 20, for example, those MNOS devices 13 which are in a low threshold state (1 volt) are rendered conductive and deliver a current to their respective sense amplifiers via FET's 27–30. Waveform 45 in FIG. 4 shows the bit line sense current indicating that a binary 0 has been stored. No current flow, of course, indicates that a given device 13 is in a high threshold state and consequently is not rendered conducting by the application of a 4 volt interrogate voltage. This is shown in FIG. 4 by waveform 46.

It is at this juncture that the problem of threshold drift previously alluded to enters the picture. Threshold drift which, in the instance of n-channel MNOS or MAOS devices, tends to cause such devices to operate in a depletion mode (the device is conductive with zero volts potential on its gate) causes a device which experiences such a phenomenon to spuriously conduct. Referrring again to FIGS. 2 and 4 and assuming that MNOS devices 13 associated with word line 20 have been set in a desired binary condition, under desired circumstances, the application of word line voltage via field effect transistor 19 and shown as waveform 43 in FIG. 4 would cause, in combination with the appropriate potential on bit lines which emanate from devices 23–26, current to flow or not flow, depending upon whether devices 13 are in the high or low threshold condition. Assuming the leftmost device 13 associated with word line 20 to be in the high threshold state, no current would flow to sense amplifiers via device 27, which is conducting, to detect the state of MNOS device 13. At this point, it should be recalled that the other word lines 21, 22 have zero potential applied thereto which in turn hold devices 13 associated with these bit lines in the nonconducting condition because their threshold of +1 volt has not been exceeded. If this were the case at all time, no problem would be experienced in reading the devices of the addressed word line. Assuming, however, that the leftmost device 13 associated with word line 21 has experienced threshold drift over a period of time due to repeated reading, writing, and erasing cycles, that device tends toward depletion mode operation or being rendered conductive with zero potential on its gate. Under the circumstances just described, where device 13 is in the high threshold state, no current will flow via device 27 to an associated sense amplifier, but, leftmost device 13 associated with word line 21 can conduct with zero potential on its word line as shown by waveform 44 in FIG. 4 and provide, via device 27, an output to an associated sense amplifier. In this manner, a binary 0 is read out spuriously when, in fact, a binary 1 should have been read out. Under such circumstances, every bit associated with a given word line which is intended to be in the high threshold state can provide a spurious output via another MNOS device 13, which is in the low threshold state associated with the same bit line and rendered spuriously conductive because of threshold drift.

To avoid the problem of spurious readout, a device similar to that shown in cross-section in FIG. 5 can be substituted for the MNOS or MAOS devices 13 of FIG. 2. Device 50 in FIG. 5 is a composite variable threshold-fixed threshold device which is utilized in the practice of the present invention to prevent spurious readout due to threshold drift. In FIG. 5 a pair of n+ diffusions 51, disposed in substrate 3, define a channel region 52 therebetween. A central portion 53 of channel region 52 is covered by a region of thin oxide 54 through which carriers are capable of tunneling. Regions 55 of silicon dioxide are considerably thicker than silicon dioxide region 54 and overlie that portion of channel region 52 on both sides of central portion 53. A layer 56 of silicon nitride, aluminum oxide, or other suitable insulation material is disposed in overlying relationship with silicon dioxide regions 54, 55. Finally, a conductive member 57, formed from a suitable metal such as aluminum, or from a doped layer of polycrystalline silicon, is disposed on layer 56 and over channel region 52. Thus, member 57 acts as a gate for the variable threshold device consisting of substrate 3, central portion 53, oxide region 54, and that portion of layer 56 overlying thin oxide region 54. At the same time, metal layer 57 acts as a common gate for fixed threshold devices on either side of central portion 53 consisting of substrate 3, oxide regions 55 and those portions of layer 56 overlying oxide portions 55.

Diffusions 51, of course, form the source and drain regions for what is, in effect, two fixed threshold devices in series with a variable threshold device; all of which are actuated by a common gate. This may be clearly seen from a consideration of FIG. 6 wherein a schematic diagram of the arrangement of FIG. 5 is shown consisting of a variable threshold device 60 disposed in series with fixed threshold devices 61, 62. All these devices are connected to a common word line which is connected to what are shown as individual gates in FIG. 6, but, is in reality a common gate 57 similar to that shown in FIG. 5.

Thus, the arrangement of FIG. 6 can be directly substituted for each of the devices 13 as shown in FIG. 2. Under such circumstances, the device 60 is written and erased in the same manner described in connection with the writing and erasing of device 13. Similarly, reading is carried out in the same manner described in connection with devices 13 and the problem of threshold drift has been overcome because of the presence of at least one fixed threshold device in series with the variable threshold device.

It has been determined that degradation of the interface characteristics only occurs where carriers tunnel from a semiconductor into the interface region between a layer of silicon dioxide and silicon nitride or aluminum oxide. Thus, the series fixed threshold devices are ordinary field effect transistors having a thickness of oxide region 55 which is sufficient to prevent any kind of tunneling whatsoever therethrough. As a result, degradation of the threshold of the device is impossible and remains fixed regardless of the number of read, write, and erase cycles carried out on the adjacent variable threshold device.

The effect on an array 10 such as shown in FIG. 2 now becomes clear. When the composite device of FIGS. 5 and 6 is substituted for each of devices 13 in array 10 of FIG. 2, in the high threshold condition, there is no conduction between diffusions 51 regardless of the threshold drift since the threshold of the variable threshold device is now much higher than the voltage applied to word line 20. On the other hand, when the variable threshold portion of the composite device of FIGS. 5 and 6 is in the low threshold state, it may become capable of conduction with zero volts on its gate due to the above indicated threshold drift. This possibility, however, is obviated by the presence of the fixed threshold devices 61, 62 of FIG. 6 which are not subject to threshold drift in series with variable threshold device 60. Accordingly, with zero volts on its gate the leftmost device associated with word line 21 in FIG. 2 is held in the nonconducting state by the fact that the threshold (1 volt, for example) of the fixed threshold device has not been exceeded and spurious conduction through devices in the low threshold condition is not possible. As a result of this simple expedient, arrays which would have only a certain useful lifetime can have their lifetimes extended indefinitely. Also, if the composite device, for fabrication reasons, becomes locked in the on or conducting state, a whole bit line with its plurality of associated storage devices need not be lost. Only the bit affected need be eliminated since the device is prevented from conducting by the series device which is nonconducting with zero voltage on its gate. Also, as a result of the presence of the series enhancement mode devices, the variable threshold storage device can be turned off quickly and hard without worrying about low threshold voltage spread due to variations in the fabrication process.

Considering again FIG. 5, it should be appreciated that the device shown can be fabricated by conventional photolithographic masking and etching techniques. It should also be appreciated that only a single fixed threshold device in series with a variable threshold device is required to carry out the teaching of the present invention. However, for fabrication reasons, it is simpler to fabricate the symmetrical device shown in FIG. 5. In FIG. 5 layer 56 may be terminated, as shown by dotted lines 58, so that it does not extend over oxide regions 55. Thus, the silicon nitride or aluminum oxide formerly disposed over oxide regions 55 may now be replaced totally with an oxide similar to that utilized for regions 55.

The fabrication of a memory array 10 with on-chip decoding is complicated by the necessity for both fixed threshold and variable threshold FET's on the same chip. The fabrication of both fixed and variable threshold devices on the same chip is made possible by using two different oxide layer thicknesses as shown in FIG. 5. The fixed threshold devices have 300 A of silicon dioxide or other suitable oxide and the variable threshold device has a 20 A oxide thickness. In the variable threshold device, the layer of silicon nitride or aluminum oxide is 500 A thick. As such, the electric field intensity in the oxide and nitride or aluminum oxide layers is insufficient to cause charge injection at the metal-insulator interface. The fabrication of the device shown in FIG. 5 requires the addition of the following steps to the usual FET process.

A. P-type epitaxial layer growth.

B. Reopening of the gate regions in the memory array and growth of 20 A of silicon dioxide after 300 A gate oxides have been grown.

C. Deposition of 500 A silicon nitride or aluminum oxide.

This results in the addition of one masking step to the usual FET fabrication process.

The above recited thicknesses are exemplary only, inasmuch as other thicknesses of oxide and silicon nitride or aluminum oxide are dependent upon circuit considerations such as bit and word line potentials. It should also be appreciated that where the primary conduction mechanism for storage of charge in a device is direct tunneling, the thickness of the silicon dioxide layer over channel region 53 should be less than 35 A thick.

One major advantage of the MNOS device is that it provides a very high circuit density. FIG. 7 shows a cell layout using the same reference characters as shown in FIG. 5. Diffused bit lines 51 are disposed in substrate 3, while metal word line 57 is shown extending over diffusions 51. Channel region 52 extends between diffusions 51 while central portion 53 is disposed intermediate diffusions 51. Nitride or aluminum oxide layer 56 is disposed over a silicon dioxide layer composed of thick oxide regions 55 and thin oxide region 54; the latter region being coextensive with central portion 53. In FIG. 7, the dashed line box shows the extent of thin oxide region 54 and the relationship of the variable threshold device to bit lines 51. The regions between the dashed line box and the edges of bit line diffusions 51 contain the fixed threshold or thick dielectric regions 55. Utilizing the approach of the present invention, a penality of no more than 20% in layout area is exacted. An attractive feature of the cell from a yield and reliability standpoint is the fact that it requires no metal-semiconductor contacts.

While the device of FIG. 5 has been defined in terms of an n-channel embodiment, it should be appreciated that the same approach can be taken with p-channel devices. Threshold drift occurs regardless of the conductivity type of the underlying substrate. When a potential is applied on the gate of an MNOS, it tends to drive the interface toward the polarity of that potential. As a result, either p- or n-channel devices can operate in a depletion mode and both can be normally conductive with a zero potential on their gates. Finally, while silicon nitride has been indicated as the preferred second insulator, it should be appreciated that aluminum oxide can be utilized without departing from the spirit and scope of the present invention. The choice of device type is determined by the requirement that the devices on the memory chip operate in the enhancement mode. Since the initial fixed charge in nitride is positive under most deposition conditions, this would indicate that p-channel devices are more likely to be enhancement mode devices in both threshold states. If the silicon nitride is replaced by aluminum oxide which has a negative initial fixed charge, then n-channel devices are more likely to be in enhancement mode.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A composite information storage device comprising:

a semiconductor substrate of one conductivity type;

a pair of regions of opposite conductivity type disposed in said substrate defining a channel region therebetween;

a variable threshold device which includes a first portion of said channel region; and, at least a fixed threshold device which includes a portion of said channel region different from said first portion.

2. A composite information storage device according to claim 1, wherein said variable threshold device is an MNOS (Metal-Nitride-Oxide-Semiconductor) device.

3. A composite information storage device according to claim 1 wherein said variable threshold device is an MAOS (Metal-Aluminumoxide-Oxide-Semiconductor) device.

4. A composite information storage device according to claim 1 wherein said fixed threshold device is an MOS (Metal-Oxide-Semiconductor) device.

5. A composite information storage device according to claim 1 wherein said fixed threshold device is an MNOS device wherein the oxide is sufficiently thick to prevent tunneling.

6. A composite information storage device according to claim 1 wherein said fixed and variable threshold devices are actuated by a common gate electrode.

7. A storage device comprising:

a semiconductor wafer of one conductivity type having disposed therein source and drain of opposite conductivity type and a channel region disposed therebetween; and, an oxide layer having at least first and second portions disposed over said channel region said first portion having a thickness sufficient to permit the tunneling of carriers therethrough and said second portion having a thickness sufficient to prevent the tunneling of carriers therethrough to provide a fixed threshold device in series with a variable threshold device.

8. A storage device according to claim 1 further including a layer of one of the materials aluminum oxide and silicon nitride disposed over at least said first portion.

9. A storage device according to claim 1 further including a gate electrode disposed over said at least first and second portions of said oxide layer.

10. A storage device according to claim 1 wherein said oxide layer is made of silicon dioxide.

11. In a memory array, the storage devices of which are subjected to repeated storage, erase and read-out cycles, a plurality of storage devices each comprising:

a semiconductor substrate having source and drain regions disposed therein and defining a channel therebetween;

means disposed in electrically coupled relationships with a portion of said channel for rendering said portion conductive at low threshold voltages, the voltages being of such magnitude as to permit spurious conduction in said channel in a depletion mode; and means disposed in electrically coupled relationship with at least another portion of said channel for rendering it conductive at a fixed thershold voltage, said fixed threshold voltage being independent of said low threshold voltages and of such magnitude as to be conductive in an enhancement mode.

12. In a memory array according to claim 11 further including a common gate electrode which is disposed over said channel region portions.

13. In a memory array according to claim 11 wherein said means for rendering said portion conductive at low threshold voltages includes a pair of insulating layers disposed over said portion of said channel and a gate electrode which is common to said region portions.

14. In a memory array according to claim 11 wherein said means for rendering said at least another portion of said channel conductive at a fixed threshold voltage includes at least an insulating layer disposed over said another portion of said channel region and a gate electrode which is common with said channel region portion.

15. In a memory array according to claim 11 wherein said means for rendering said portion conductive at low threshold voltages is an MNOS (Metal-Nitride-Oxide-Semiconductor) device.

16. In a memory array according to claim 11 wherein said means for rendering said porton conductive at low threshold voltages is an MAOS (Metal-Aluminum-Oxide-Semiconductor) device.

17. In a memory array according to claim 12 further including means connected to said common gate and to said source and drain regions for applying potentials thereto to read, write, and erase information.

18. In a memory array according to claim 14 wherein said at least one insulating layer is silicon dioxide.

19. In a memory array according to claim 14 wherein said at least an insulating layer is a layer of silicon dioxide and a layer of silicon nitride.

20. In an array, a circuit arrangement comprising, a plurality of variable threshold information storage devices which have changed from enchancement mode to depletion mode devices at low threshold due to repeated cycling, said devices being connected to bit and word lines, means connected to said devices for reading information stored in at least a selected device and, means connected in series with each of said devices for blocking the conduction of devices other than said at least a selected device during reading of said at least a selected device.

21. In an array, a circuit arrangement according to claim 20 wherein said variable threshold information storage devices are MNOS (Metal-Nitride-Oxide-Semiconductor) devices.

22. In an array, a circuit arrangement according to claim 20 wherein said variable threshold information storage devices are MAOS (Metal-Aluminum oxide-Oxide-Semiconductor) devices.

23. In an array, a circuit arrangement according to claim 20 wherein said means for blocking includes at least an enhancement mode field effect transistor disposed in series with each of said variable threshold information storage devices.

24. In an array, a circuit arrangement according to claim 20 further including means connected to said array for writing information into at least one of said devices.

25. In an array, a circuit arrangement according to claim 23 wherein said field effect transistor and said variable threshold device have a common gate electrode.

* * * * *